US012583454B2

(12) United States Patent　(10) Patent No.: US 12,583,454 B2
Minase et al.　(45) Date of Patent: Mar. 24, 2026

(54) REVERSE SUPPORT APPARATUS

(71) Applicant: TOYOTA JIDOSHA KABUSHIKI KAISHA, Toyota (JP)

(72) Inventors: Yuki Minase, Toyota (JP); Masayuki Shakutsui, Nisshin (JP); Ichiya Shimomura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1 day.

(21) Appl. No.: 18/768,249

(22) Filed: Jul. 10, 2024

(65) Prior Publication Data

US 2025/0050887 A1　Feb. 13, 2025

(30) Foreign Application Priority Data

Aug. 9, 2023　(JP) ................................. 2023-129749

(51) Int. Cl.
　B60W 30/18　(2012.01)
　B60W 50/08　(2020.01)
　B60W 50/14　(2020.01)

(52) U.S. Cl.
　CPC ...... B60W 30/18036 (2013.01); B60W 50/08 (2013.01); B60W 50/082 (2013.01); B60W 50/14 (2013.01); B60W 2050/146 (2013.01); B60W 2540/215 (2020.02); B60W 2554/4044 (2020.02)

(58) Field of Classification Search
　None
　See application file for complete search history.

(56) References Cited

U.S. PATENT DOCUMENTS

| | | | | |
|---|---|---|---|---|
| 6,704,653 B2 * | 3/2004 | Kuriya | ............... | B62D 15/0275 |
| | | | | 348/148 |
| 8,521,351 B2 * | 8/2013 | Nakamura | .......... | B60L 15/2063 |
| | | | | 701/22 |
| 8,538,620 B2 * | 9/2013 | Nakamura | .............. | B60L 50/51 |
| | | | | 701/22 |
| 9,026,326 B2 * | 5/2015 | Nozu | .................... | B60W 10/04 |
| | | | | 701/65 |
| 9,506,558 B2 * | 11/2016 | Fujiyoshi | ................ | F16H 59/44 |
| 9,824,585 B2 * | 11/2017 | Takeuchi | .................. | B60T 7/22 |
| 9,836,060 B2 * | 12/2017 | Ghneim | ................. | G06V 20/56 |
| 9,981,690 B2 * | 5/2018 | Lavoie | ................. | B62D 15/024 |

(Continued)

FOREIGN PATENT DOCUMENTS

| | | | | | |
|---|---|---|---|---|---|
| CN | 109421800 A | * | 3/2019 | ......... | B62D 15/0285 |
| CN | 110065496 A | * | 7/2019 | ...... | B60W 30/18145 |

(Continued)

*Primary Examiner* — Kevin R Steckbauer

(74) *Attorney, Agent, or Firm* — Sughrue Mion, PLLC

(57)　ABSTRACT

A reverse support apparatus comprises a storage device in which a forward path passed by a vehicle when the vehicle travels forward is stored, and a controller configured to be able to execute a reverse support control for the vehicle to travel backward along the forward path. The controller makes a suggestion to a driver of the vehicle to execute the reverse support control, when it is determined that a suggestion condition is satisfied based on a situation around the vehicle or a backward path passed by the vehicle when the vehicle travels backward. The controller executes the reverse support control when the driver consents the suggestion.

4 Claims, 6 Drawing Sheets

(56)  References Cited

U.S. PATENT DOCUMENTS

| | | | |
|---|---|---|---|
| 11,097,733 B2 * | 8/2021 | Choi | B60W 10/20 |
| 11,190,738 B2 * | 11/2021 | Sperrle | B60T 8/172 |
| 11,820,363 B2 * | 11/2023 | Oyama | B60W 10/18 |
| 2013/0090799 A1 * | 4/2013 | Nakamura | B60W 30/18 |
| | | | 701/22 |
| 2013/0090800 A1 * | 4/2013 | Nakamura | B60L 15/2063 |
| | | | 701/22 |
| 2013/0184947 A1 * | 7/2013 | Nozu | B60W 10/119 |
| | | | 701/54 |
| 2014/0184785 A1 * | 7/2014 | Sperrle | B60T 8/172 |
| | | | 348/113 |
| 2016/0240084 A1 * | 8/2016 | Takeuchi | B60T 7/22 |
| 2016/0298758 A1 * | 10/2016 | Fujiyoshi | B60W 60/0053 |
| 2017/0123431 A1 * | 5/2017 | Ghneim | B60W 10/04 |
| 2017/0297619 A1 * | 10/2017 | Lavoie | B62D 15/024 |
| 2019/0225267 A1 * | 7/2019 | Ohtani | G06V 20/586 |
| 2019/0283513 A1 * | 9/2019 | Shepard | B60D 1/62 |
| 2020/0175773 A1 * | 6/2020 | Gibson | G06T 19/006 |
| 2023/0159028 A1 * | 5/2023 | Fukui | B60W 30/0956 |
| | | | 701/301 |
| 2025/0050887 A1 * | 2/2025 | Minase | B60W 50/082 |

FOREIGN PATENT DOCUMENTS

| | | | | |
|---|---|---|---|---|
| CN | 109421800 B | * | 5/2021 | B62D 15/0285 |
| CN | 113811934 A | * | 12/2021 | B60W 30/18163 |
| CN | 110065496 B | * | 7/2022 | G06V 20/586 |
| CN | 113811934 B | * | 11/2022 | B60W 50/14 |
| CN | 119459760 A | * | 2/2025 | B60W 50/08 |
| EP | 3806067 A1 | * | 4/2021 | B60W 30/06 |
| JP | 2007237930 A | * | 9/2007 | |
| JP | 4661639 B2 | * | 3/2011 | |
| JP | 4769528 B2 | * | 9/2011 | |
| JP | 2018034651 A | * | 3/2018 | B60R 1/00 |
| JP | 6721074 B1 | * | 7/2020 | G08G 1/166 |
| JP | 2020147281 A | * | 9/2020 | |
| JP | 2021062678 A | * | 4/2021 | B60W 30/06 |
| JP | 2021187362 A | * | 12/2021 | |
| JP | 2023005644 A | * | 1/2023 | G07C 5/008 |
| JP | 7434866 B2 | * | 2/2024 | |
| JP | 7613608 B2 | * | 1/2025 | B60W 50/14 |
| JP | 7622900 B2 | * | 1/2025 | G08G 1/166 |
| JP | 7683715 B2 | * | 5/2025 | G06V 20/58 |
| JP | 7683731 B2 | * | 5/2025 | B60W 30/18163 |
| WO | WO-2024013874 A1 | * | 1/2024 | G08G 1/16 |
| WO | WO-2024013996 A1 | * | 1/2024 | G08G 1/16 |
| WO | WO-2024013997 A1 | * | 1/2024 | G08G 1/16 |

* cited by examiner

EXAMPLE 1

REVERSE SUPPORT APPARATUS

TECHNICAL FIELD

The present disclosure relates to a reverse support apparatus configured to execute a reverse support control for a vehicle to travel backward along a forward path passed by the vehicle when the vehicle travels forward.

BACKGROUND

Conventionally, there has been known a reverse support apparatus configured to be able to execute a reverse support control for a vehicle to travel backward along a forward path. For example, the reverse support apparatus described in Patent Document 1 (hereinafter, referred to as a "conventional apparatus") determines whether or not a driver inputs a reverse request signal into the conventional apparatus when the vehicle enters a travel restriction area. When the reverse request signal is input into the conventional apparatus, the conventional apparatus executes the reverse support control.

The travel restriction areas include areas where travel is originally restricted (e.g., dead-end and one-way roads) and an area where travel is temporarily restricted by other obstacles. The reverse request signal is input when the driver consents (agrees) that the conventional apparatus executes the reverse support control.

Patent Document 1: U.S. Pat. No. 11,097,733B2

SUMMARY

The conventional apparatus does not execute the reverse support control if the reverse request signal is not input into the conventional apparatus. When the driver desires to execute the reverse support control, the driver needs to voluntarily perform a "consent operation for inputting the reverse request signal". If the driver does not know that the consent operation is required for the conventional apparatus to execute the reverse support control, the driver does not perform the consent operation, even in a situation where the reverse support control is available. Therefore, an opportunity to execute the reverse support control may be lost.

The present disclosure has been made to address the above-described problem. In other words, an object of the present disclosure is to provide a reverse support apparatus capable of reducing a possibility of losing the opportunity to execute the reverse support control.

A reverse support apparatus (hereinafter, referred to as the "present disclosure apparatus") comprises:

a storage device (38) in which a forward path passed by a vehicle when the vehicle travels forward is stored; and a controller (20) configured to be able to execute a reverse support control for the vehicle to travel backward along the forward path.

The controller is configured to:

make a suggestion to a driver of the vehicle to execute the reverse support control (Step320), when it is determined that a suggestion condition is satisfied based on a situation around the vehicle or a backward path passed by the vehicle when the vehicle travels backward ("Yes" at Step310, "Yes" at Step315, "Yes" at Step510, "Yes" at Step605); and execute the reverse support control (Step330, Step 400-Step495) when the driver consents the suggestion ("Yes" at Step325).

According to the present disclosure apparatus, when it is determined that the suggestion condition is satisfied, the present disclosure apparatus makes the suggestion to the driver to execute the reverse support control. Thus, even if the driver does not recognize that the reverse support control is available, the driver can be made aware that the reverse support control is available. Therefore, it is possible to prevent the opportunity to execute the reverse support control from being lost.

Further, according to the present disclosure apparatus, it is determined whether or not the suggestion condition is satisfied based on the situation around the vehicle or the backward path. Therefore, it is possible to determine that the suggestion condition is satisfied when there is a high possibility that the driver needs to execute the reverse support control, and it is possible to reduce the possibility that the driver feels that the suggestion of the execution of the reverse support control is troublesome.

DETAILED DESCRIPTION

Figure 1:
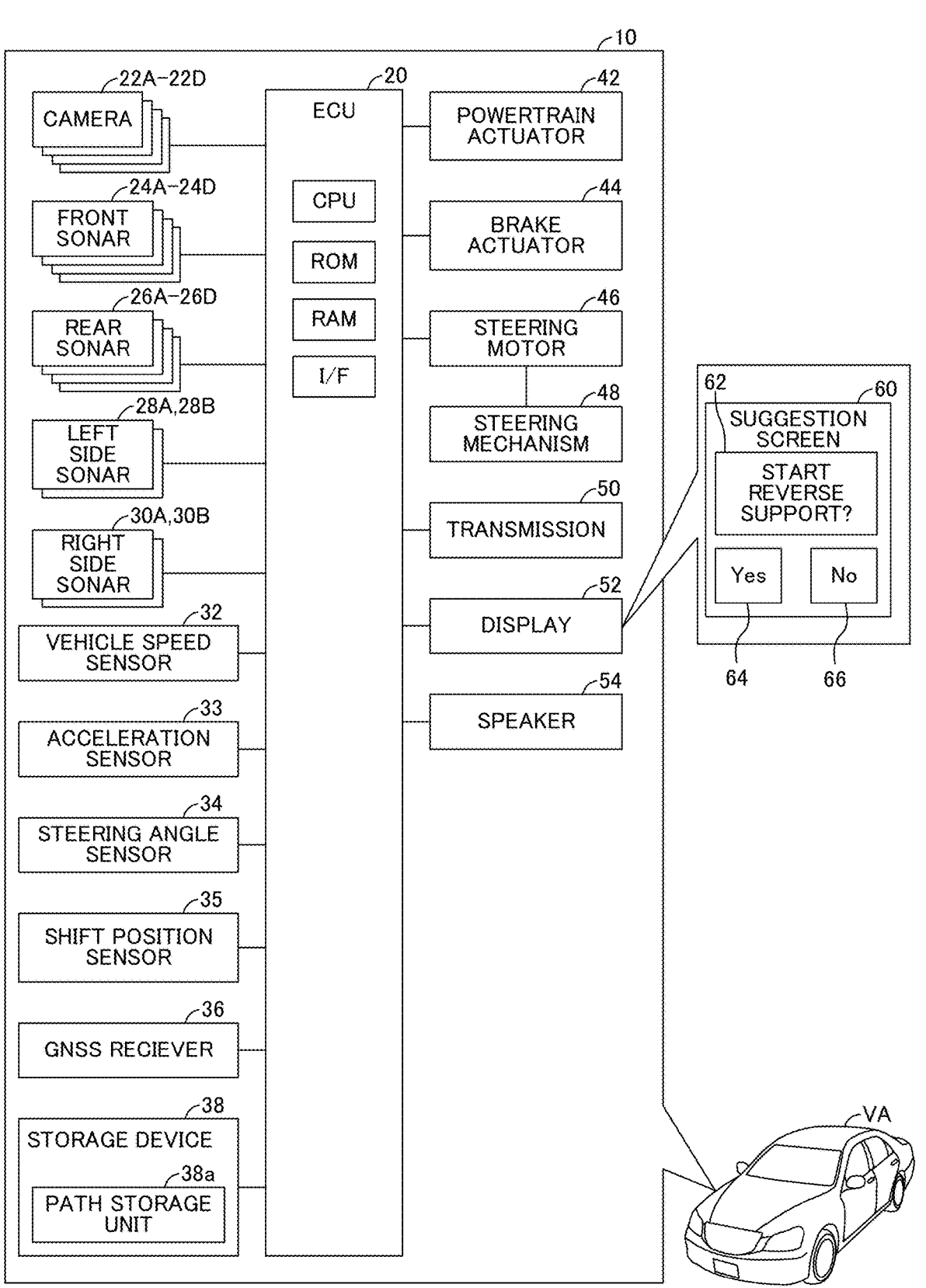
FIG. 1 is a schematic system configuration diagram of a reverse support control apparatus according to an embodiment of the present disclosure.

As illustrated in FIG. 1, a reverse support device 10 (hereinafter, referred to as the "present device 10") according to the present embodiment is applied to a vehicle VA and includes components illustrated in FIG. 1.

An ECU 20 is an ECU that executes a reverse support control, which is a kind of automated driving. The reverse support control is a control for causing the vehicle VA to travel backward along a forward path along which the vehicle VA passed while the vehicle VA was traveling forward.

In the present specification, the "ECU" is an electronic control unit including a microcomputer as a main part. The ECU is also referred to as a control unit, a controller or a computer. The microcomputer includes a CPU (a processor), a ROM, a RAM, an interface (I/F), and the like. A function realized by the ECU 20 may be realized by a plurality of ECUs.

A plurality of cameras 22A-22D are a front camera, a left camera, a right camera and a rear camera, respectively. The front camera, the left camera, the right camera, and the rear camera capture a front area, a left area, a right area, and a rear area of the vehicle VA, respectively, and acquire front image data, left image data, right image data, and rear image data. When the cameras 22A-22D do not need to be distinguished, each of these is referred to as a "camera 22". When the front image data, the left image data, the right image data, and the rear image data do not need to be distinguished, each of these is referred to as "image data".

Each of sonars comprised by the apparatus 10 will be described below. The sonar transmits ultrasonic waves and receives the ultrasound waves reflected by an object. The sonar specifies a distance to the object based on a time from transmission of the ultrasonic waves to reception of the ultrasonic waves, and transmits sonar object information including the distance to the ECU 20.

Front sonars 24A-24D are arranged in a front bumper (not shown) of the vehicle VA, rear sonars 26A-26D are arranged in a rear bumper (not shown) of the vehicle VA, left side sonars 28A and 28B are arranged in the left side of the vehicle VA, and right side sonars 30A and 30B are arranged in the right side of the vehicle VA.

The front sonars 24A-24D acquire the distance to the object in the front area of the vehicle VA, the rear sonars 26A-26D acquire the distance to the object in the rear area of the vehicle VA, the left side sonars 28A and 28B acquire the distance to the object in the left area of the vehicle VA, and the right side sonars 30A and 30B acquire the distance to the object in the right area of the vehicle VA.

A vehicle speed sensor 32 measures a speed of the vehicle VA (a vehicle speed Vs). An acceleration sensor 33 measures an acceleration G in a front-rear axial direction of the vehicle VA. A steering angle sensor 34 measures a steering angle $\theta$ of a steering wheel (not shown). A shift position sensor 35 detects a position of a shift lever (not shown) of the vehicle VA (a shift position). The ECU 20 acquires the measured (detected) values from these sensors. The shift positions include a N range (a neutral position), a P range (a parking position), a D range (a forward position), a R range (a reverse position), and the like. A GNSS receiver 36 receives signals from a plurality of satellites and specifies the present position (latitude and latitude) of the vehicle VA based on the received signals.

A storage device 38 has a path storage unit 38a. A forward path information regarding a forward path is stored in the path storage unit 38a. The forward path is a path along which the vehicle VA passed while the vehicle VA was traveling forward.

A powertrain actuator 42 changes a driving force generated by a driving device (for example, an internal combustion engine and/or an electric motor) of the vehicle VA. A brake actuator 44 controls a braking force applied to the vehicle VA. A steering motor 46 is incorporated in a steering mechanism 48. The steering mechanism 48 is a mechanism for turning steered wheels in response to an operation of the steering wheel. In response to an instruction from the ECU 20, the steering motor 46 causes the steering mechanism 48 to generate an auto-steering torque for changing the steering angle of steered wheels. A transmission ratio and the shift range of a transmission 50 are controlled based on the shift position. Note that the transmission 50 may be any of a gear type transmission and a continuously variable transmission. A display 52 is a touch panel type display, and is arranged at a position visible to the driver in a cabin of the vehicle VA. A suggestion screen 60 described later is displayed on the display 52. The speaker 54 is arranged in the cabin. The speaker 54 outputs a suggestion voice message described later.

<Reverse Support Control>

When the vehicle speed Vs is equal to or lower than a predetermined threshold vehicle speed Vsth and the shift position is the D range, the present apparatus 10 acquires the forward path information regarding the forward path along which the vehicle VA passes, and stores the forward path information in the path storage unit 38a. The forward path information includes an estimated position, a road surface image, and a GNSS position.

The estimated position is the present position of the vehicle VA estimated based on the previous estimated positions. The present apparatus 10 estimates the present position of the vehicle VA based on the vehicle speed Vs and the steering angle $\theta$. The road surface image is acquired from, for example, an overhead view image generated based on the image data acquired by the cameras 22. The GNSS position is the present position of the vehicle VA specified by the GNSS receiver 36.

When the present apparatus 10 detects that the driver has performed a predetermined consent operation, the present apparatus 10 starts the reverse support control. In the reverse support control, the present apparatus 10 compares the GNSS position acquired at the present time and the road surface image acquired at the present time with the GNSS position and the road surface image of the forward path information stored in the route storage unit 38a, respectively, to specify the present position of the vehicle VA relative to the forward path. Thereafter, the present apparatus 10 acquires a target steering angle $\theta$tgt for the vehicle VA to travel backward along the forward path based on the specified present position of the vehicle VA and the forward path. The present apparatus 10 controls the steering motor 46 so that the steering angle $\theta$ coincides with the target steering angle $\theta$tgt.

In the reverse support control, the present apparatus 10 acquires a target acceleration Gtgt for the vehicle speed Vs to be equal to or lower than a predetermined reverse speed Vre. The present apparatus 10 controls the powertrain actuator 42 and the brake actuator 44 so that the acceleration G coincides with the target acceleration Gtgt.

(Outline of Operation)

The present apparatus 10 determines whether or not a suggestion condition is satisfied based on a situation around the vehicle VA or a backward path along which the vehicle VA passes while the vehicle VA is traveling backward. When the suggestion condition is satisfied, the present apparatus 10 displays, on the display 52, the suggestion screen 60 for suggesting that the present apparatus 10 executes the reverse support control.

The present apparatus 10 determines that the suggestion condition is satisfied when it is determined that the vehicle VA cannot travel forward based on the situation around the vehicle VA. Specifically, when the present apparatus 10 determines that the following condition A or condition B is satisfied based on the situation around the vehicle VA, the present apparatus 10 determines that the suggestion condition is satisfied.

Condition A: Condition that a road width W representing a width of a road on which the vehicle VA is traveling is equal to or narrower than a predetermined threshold width Wth and that an oncoming vehicle is detected within a predetermined distance from the vehicle VA.

Condition B: Condition that the road on which the vehicle VA is traveling is dead end or that the vehicle VA is located in a narrow place where the width of the road is such a width that the vehicle VA cannot travel.

When the present apparatus 10 determines that the reverse support control can be executed based on the backward path, the present apparatus 10 determines that the suggestion condition is satisfied. Specifically, when the present apparatus 10 determines that any one of the following condition C1 and condition C2 is satisfied based on the backward path, the present apparatus 10 determines that the suggestion condition is satisfied.

Condition C1: Condition that a backward time during which the vehicle VA is traveling backward along the forward path is equal to or longer than a predetermined threshold time.

Condition C2: Condition that a backward distance traveled backward along the forward path by the vehicle VA is equal to or longer than a predetermined threshold distance.

Note that the condition A is described in an example 1, the condition B is described in an example 3, and the condition C1 and the condition C2 are described in an example 2.

The suggestion screen 60 includes a suggestion message 62, a consent button 64, and a reject button 66. A message for suggesting to the driver that the present apparatus 10 executes the reverse support control is displayed as the suggestion message 62. Specifically, as shown in FIG. 1, a message "Start a reverse support?" is displayed as the suggestion message 62. The driver touches the consent button 64 when the driver consents the suggestion (in other words, when the driver consents that the present apparatus 10 executes the reverse support control). The driver touches the reject button 66 when the driver rejects the suggestion (in other words, when the driver rejects the execution of the reverse support control). When the consent button 64 is touched, a consent signal is input to the ECU 20. When the reject button 66 is touched, a reject signal is input to ECU 20.

The above-described suggestion condition is satisfied when there is a high possibility that the reverse support control is executed. When the suggestion condition is satisfied, the suggestion screen 60 is displayed. Accordingly, even when the driver does not recognize the situation in which the reverse support control is available, the suggestion screen 60 is displayed, and thus the possibility of losing the opportunity of executing the reverse support control can be reduced. The possibility that the proposal screen 60 is displayed can be reduced in spite of a situation in which the reverse support control is not available. Accordingly, it is possible to reduce a possibility that the driver feels troublesome in the proposal screen 60.

Specific Operation

Example 1

Figure 2:
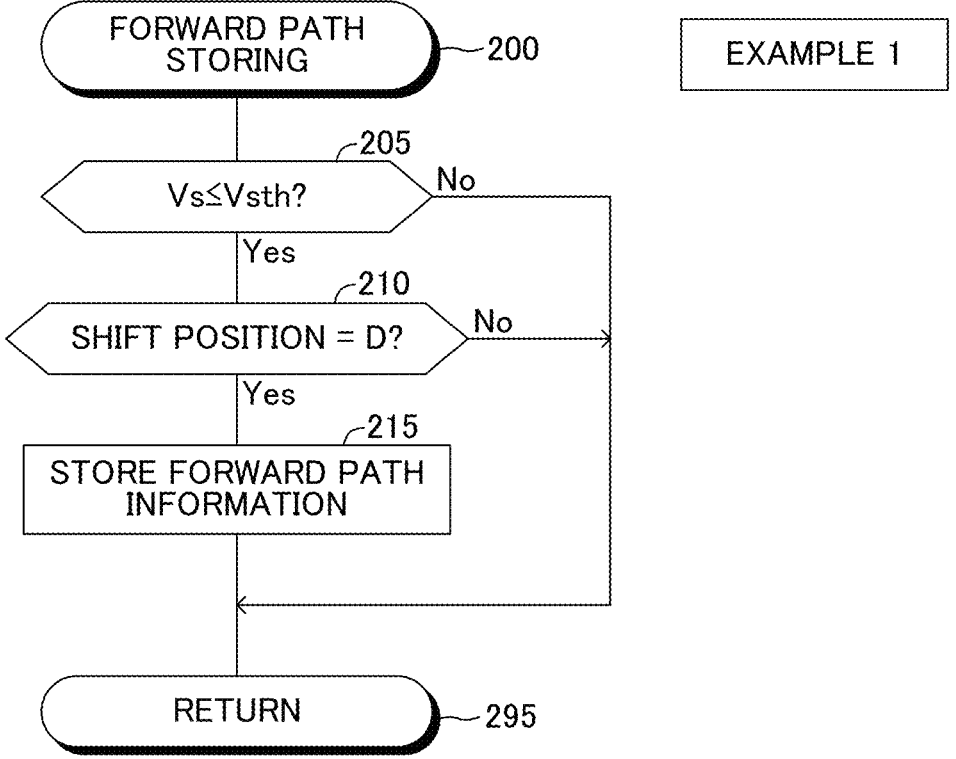
FIG. 2 is a flowchart illustrating a routine executed by a CPU of an ECU of the reverse support apparatus according to an example 1.
Figure 3:
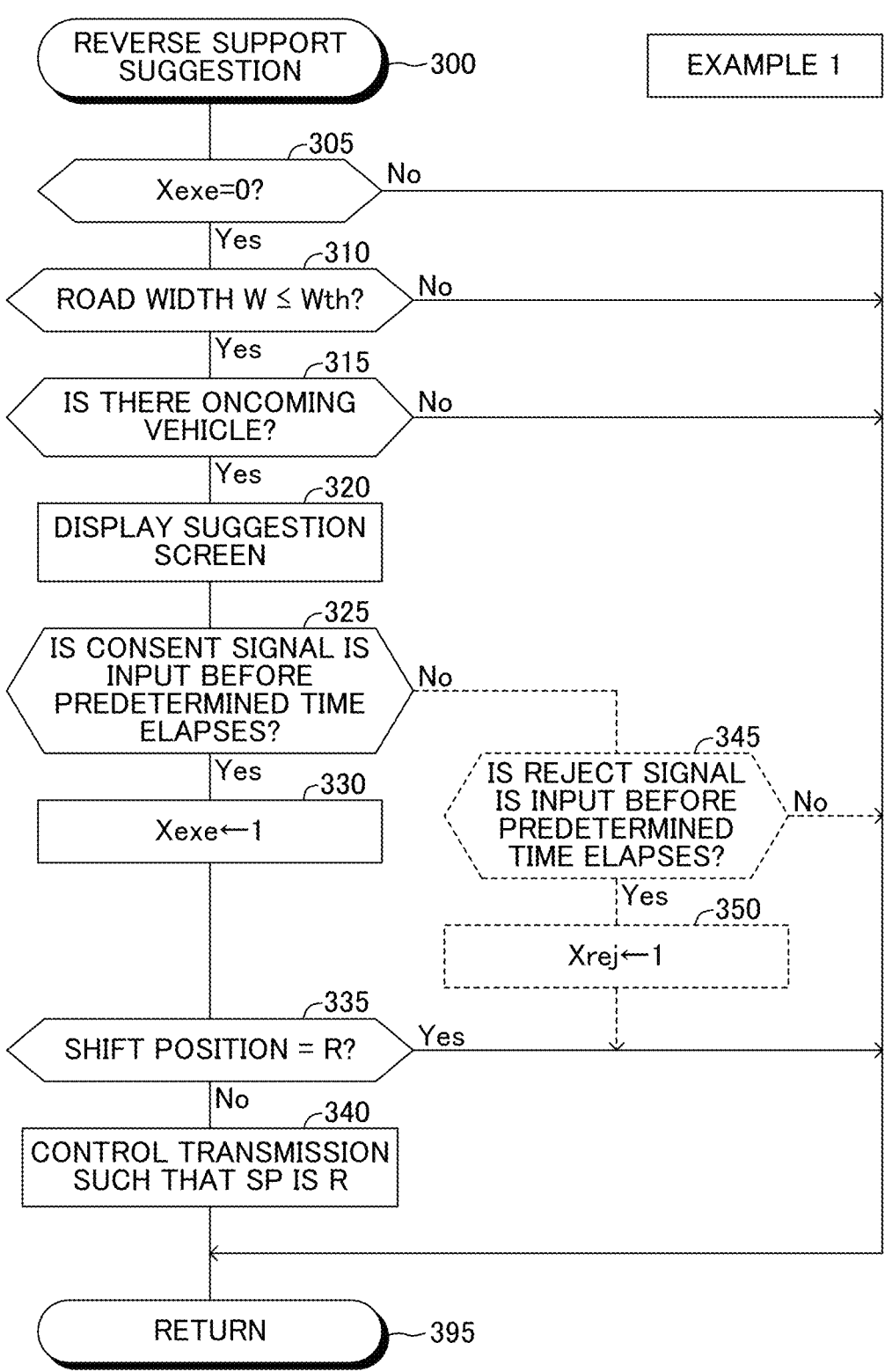
FIG. 3 is a flowchart illustrating a routine executed by the CPU of the ECU of the reverse support apparatus according to the example 1.
Figure 4:
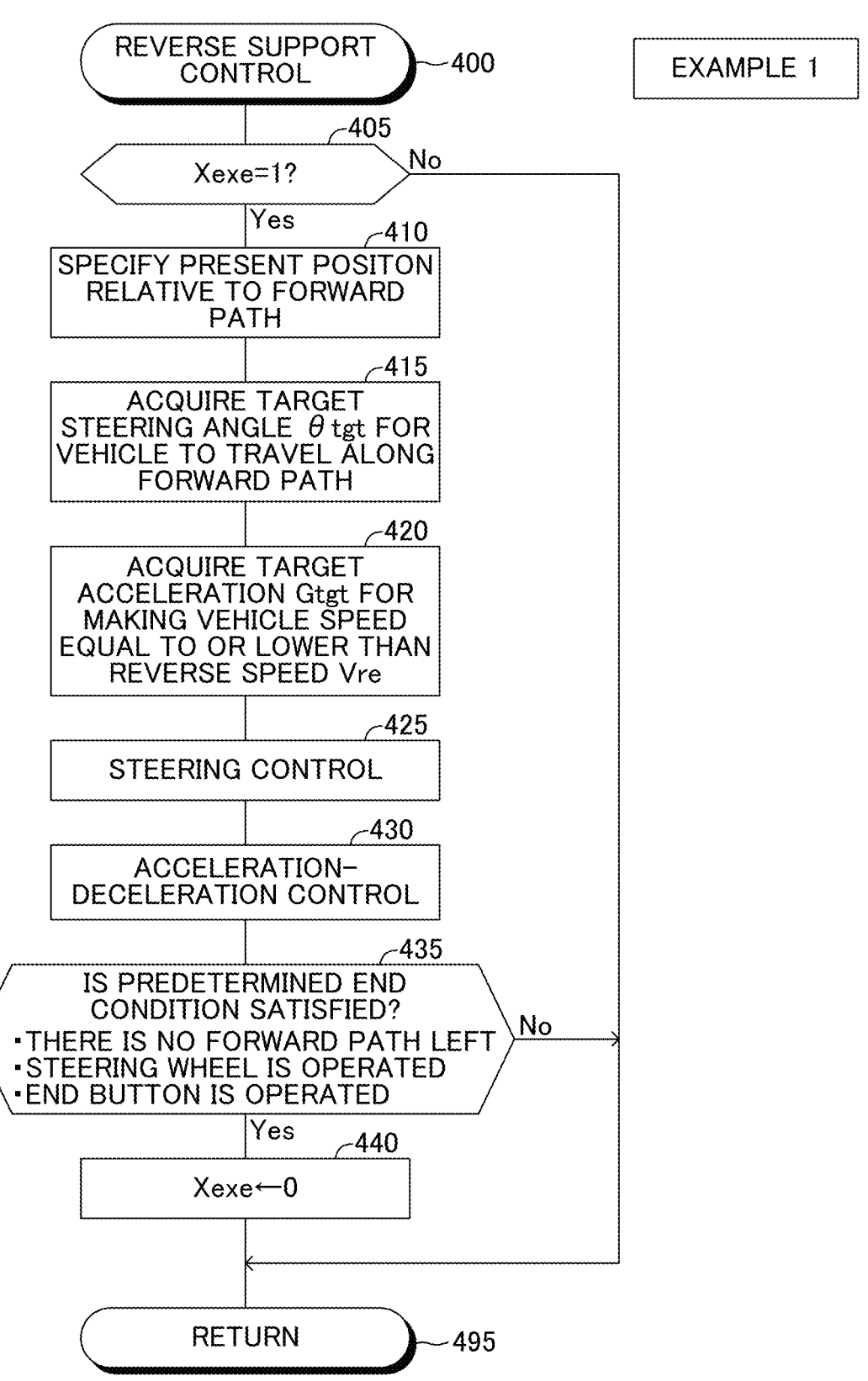
FIG. 4 is a flowchart illustrating a routine executed by the CPU of the ECU of the reverse support apparatus according to the example 1.

The CPU of the ECU 10 executes routines shown in flowcharts in FIG. 2 to FIG. 4, every time a predetermined time elapses.

<Forward Path Storing Routine>

When an appropriate time point comes, the CPU starts a process from step 200 in FIG. 2, and the process proceeds to Step 205. At Step 205, the CPU determines whether or not the vehicle speed Vs is equal to or lower than the threshold vehicle speed Vsth.

When the vehicle speed Vs is equal to or lower than the threshold vehicle speed Vsth, the CPU makes a "Yes" determination at Step 205, and the process proceeds to Step 210. At Step 210, the CPU determines whether or not the shift position is the D range.

When the shift position is the D range, the CPU makes a "Yes" determination at Step 210, and the process proceeds to Step 215. At Step 215, the CPU stores the forward path information in the path storage unit 38a. Thereafter, the process proceeds to Step 295, and the CPU terminates the present routine tentatively.

In a case where the vehicle speed Vs is higher than the threshold vehicle speed Vsth when the process proceeds to Step 205, the CPU makes a "No" determination at Step 205. Thereafter, the process proceeds to Step 295, and the CPU terminates the present routine tentatively.

In a case where the shift position is the D range when the process proceeds to Step 210, the CPU makes a "No" determination at Step 210. Thereafter, the process proceeds to Step 295, and the CPU terminates the present routine tentatively.

<Reverse Support Suggestion Routine>

When an appropriate time point comes, the CPU starts a process from step 300 in FIG. 3, and the process proceeds to Step 305. At Step 305, the CPU determines whether or not a value of an execution flag Xexe is "0".

The value of the execution flag is set to "1" when the CPU starts the reverse support control. The value of the execution flag Xexe is set to "0" when the CPU ends the reverse support control. Note that the value of the execution flag Xexe is set to "0" in an initialization routine. The initialization routine is a routine executed by the CPU when a position of an unillustrated ignition key switch of the vehicle VA is switched from an off position to an on position.

When the value of the execution flag Xexe is "0", the CPU makes a "Yes" determination at Step 305, and the process proceeds to Step 310. At Step 310, the CPU specifies the road width W based on the front image data, and determines whether or not the road width W is equal to or narrower than the threshold width Wth. The threshold width Wth has been set to a value representing a width that prevents the vehicle VA from passing by the oncoming vehicle. For example, the threshold width Wth has been set to a value representing a width that is approximately twice a vehicle width of the vehicle VA.

The road width W is equal to or narrower than the threshold width Wth, the CPU makes a "Yes" determination at Step 310, and the process proceeds to Step 315. At Step 315, the CPU determines whether or not there is the oncoming vehicle based on the front image data.

When there is the oncoming vehicle, the CPU makes a "Yes" determination at Step 315, and executes Step 320 and Step 325.

Step 320: The CPU displays the suggestion screen 60 on the display 52.

Step 325: The CPU determines whether or not the consent signal is input before a predetermined time elapses after displaying the suggestion screen 60.

When the consent signal is input before the predetermined time elapses, the CPU makes a "Yes" determination at Step 325, and executes Step 330 and Step335.

Step 330: The CPU sets the value of the execution flag Xexe to "1".

Step 335: The CPU determines whether or not the shift position is the R range.

When the shift position is not the R range, the CPU makes a "No" determination at Step 335, and the process proceeds to Step 340. At Step 340, the CPU controls the transmission 50 such that the shift position is the R range. Thereafter, the process proceeds to Step 395, and the CPU terminates the present routine tentatively.

On the other hand, the shift position is the R range, the CPU makes a "Yes" determination at Step 335. In this case, the process proceeds to Step 395, and the CPU terminates the present routine tentatively.

In a case where the value of the execution flag Xexe is "1" when the process proceeds to Step 305, the CPU makes a "No" determination at Step 305. In this case, the process proceeds to Step 395, and the CPU terminates the present routine tentatively.

In a case where the road width W is wider than the threshold width Wth when the process proceeds to Step 310, the CPU makes a "No" determination at Step 310. In this case, the process proceeds to Step 395, and the CPU terminates the present routine tentatively.

In a case where there is not the oncoming vehicle when the process proceeds to Step 315, the CPU makes a "No" determination at Step 315. In this case, the process proceeds to Step 395, and the CPU terminates the present routine tentatively.

In a case where the consent signal is not input before the predetermined time elapses when the process proceeds to Step 325, the CPU makes a "No" determination at Step 325. In this case, the process proceeds to Step 395, and the CPU terminates the present routine tentatively. Note that Step 345 and Step 350 shown in FIG. 3 will be described later.

<Reverse Support Control Routine>

When an appropriate time point comes, the CPU starts a process from step 400 in FIG. 4, and the process proceeds to Step 405. At Step 405, the CPU determines whether or not the value of the execution flag Xexe is "1".

When the value of the execution flag Xexe is "0", the CPU makes a "No" determination at Step 405. In this case, the process proceeds to Step 495, and the CPU terminates the present routine tentatively.

When the value of the execution flag Xexe is "1", the CPU makes a "Yes" determination at Step 405, and executes Step 410 to Step 435.

Step 410: The CPU specifies the present position of the vehicle VA relative to the forward path based on the GNSS position and the road image.

Step 415: The CPU acquires, based on the specified present position of the vehicle VA, the target steering angle θtgt for the vehicle VA to travel backward along the forward path.

Step 420: The CPU acquires the target acceleration Gtgt for making the vehicle speed Vs equal to or lower than the reverse speed Vre.

Step 425: The CPU executes a steering control for controlling the steering motor 46 so that the steering angle θ coincides with the target steering angle θtgt.

Step 430: The CPU executes an acceleration-deceleration control for controlling the powertrain actuator 42 and the brake actuator 44 so that the acceleration G coincides with the target acceleration Gtgt.

Step 435: The CPU determines whether or not a predetermined end condition is satisfied.

The CPU determines that the end condition is satisfied when one of the following condition D to condition F is satisfied.

Condition D: Condition that the vehicle VA has traveled backward along all forward path represented by the forward path information stored in the route storage unit 38a Condition E: Condition that the steering wheel is operated Condition F: Condition that an end button (not shown) is operated When the end condition is not satisfied, the CPU makes a "No" determination at Step 435. In this case, the process proceeds to Step 495, and the CPU terminates the present routine tentatively.

When the end condition is satisfied, the CPU makes a "Yes" determination at Step 435. In this case, the process proceeds to Step 440, and the CPU sets the execution flag Xexe to "0". Thereafter, the process proceeds to Step 495, and the CPU terminates the present routine tentatively.

According to the present example, when it is determined that the vehicle VA cannot pass by the oncoming vehicle based on the situation around the vehicle VA, it is determined that the suggestion condition is satisfied. In this case, the suggestion screen 60 is displayed. Accordingly, the possibility of losing the opportunity of executing the reverse support control can be reduced, and the possibility that the driver feels troublesome in the suggestion to execute the reverse support control can be reduced.

Example 2

Figure 5:
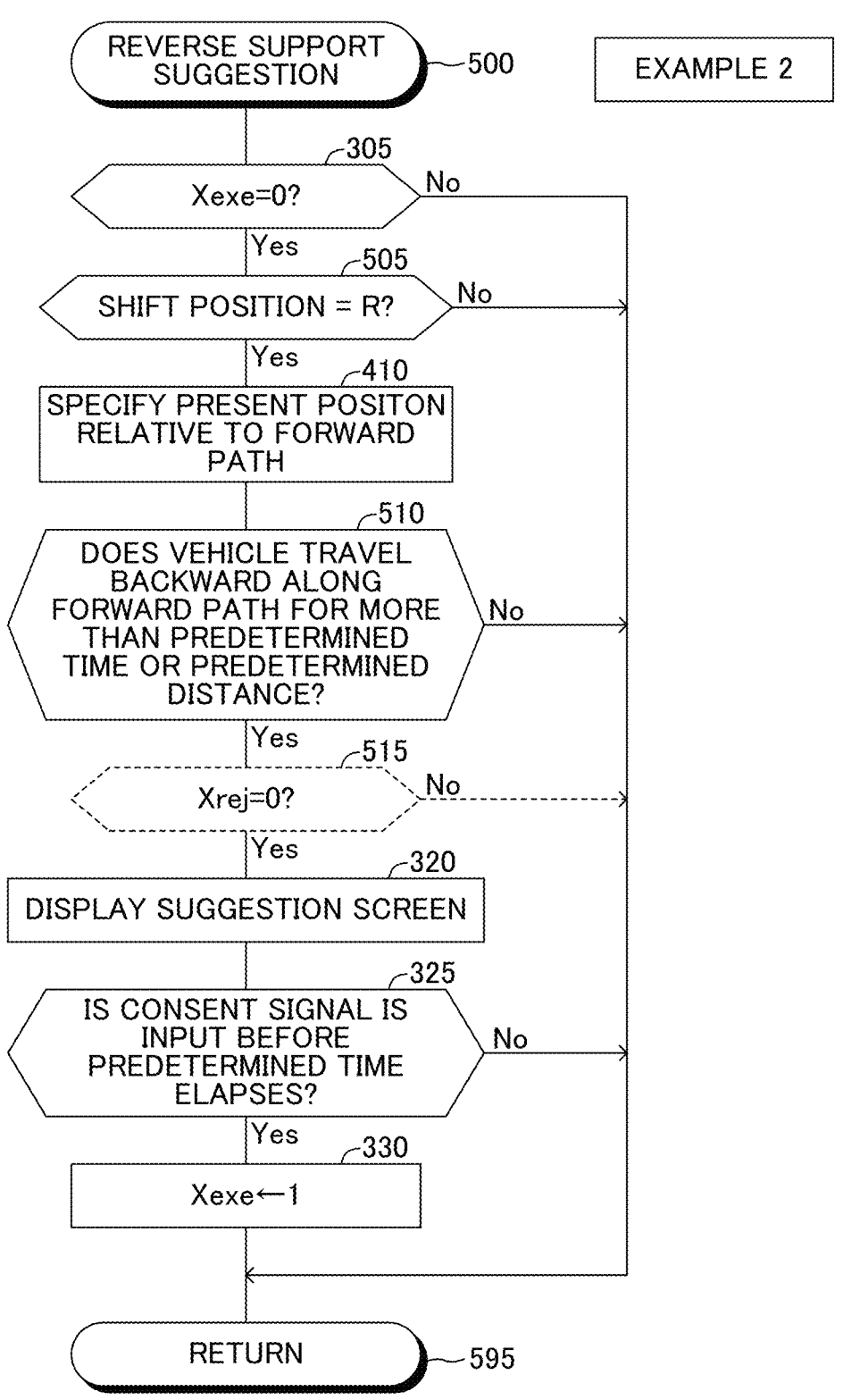
FIG. 5 is a flowchart illustrating a routine executed by the CPU of the ECU of the reverse support apparatus according to an example 2.

The CPU according to the present example executes a routine shown in FIG. 5 instead of the routine shown in FIG. 3. Note that the same reference numerals are given to the same processes as those shown in FIG. 3 and FIG. 4, and descriptions of the processes are omitted.

When an appropriate time point comes, the CPU starts a process from Step 500 in FIG. 5. When the value of the execution flag Xexe is "0" ("Yes" at Step 305 shown in FIG. 5), the process proceeds to Step 505. At step 505, the CPU determines whether or not the shift position is the R range.

When the shift position is the R range, the CPU makes a "Yes" determination at Step 505. At Step 410 shown in FIG. 5, the CPU specifies the present position of the vehicle VA relative to the forward path.

Thereafter, the process proceeds to Step 510, and the CPU determines whether or not one of the condition C1 and the condition 2 is satisfied. Note that the CPU determines that the vehicle VA travels backward along the forward path when a distance between the present position of the vehicle VA specified at Step 410 shown in FIG. 5 and the forward path is equal to or shorter than a predetermined distance.

When one of the condition C1 and the condition C2 is satisfied, the CPU makes a "Yes" determination at Step 510. In this case, the process does not proceed to Step 515 shown by a dotted line in FIG. 5, but proceeds to step 320 shown in FIG. 5. At Step 320 shown in FIG. 5, the CPU displays the suggestion screen 60 on the display 52. Step 515 shown by a dotted line in FIG. 5 will be described later. When the consent signal is not input within the predetermined time ("No" at Step 325 shown in FIG. 5), the process proceeds to Step 595, and the CPU terminates the present routine tentatively.

In a case where the value of the execution flag Xexe is "1" ("No" at Step 305 shown in FIG. 5) when the process proceeds to Step 305 shown in FIG. 5, the process proceeds to Step 595, and the CPU terminates the present routine tentatively. In a case where neither the condition C1 nor the condition C2 is satisfied ("No" at Step 510) when the process proceeds to Step 510, the process proceeds to Step 595, and the CPU terminates the present routine tentatively.

According to the present example, when the backward time during the vehicle VA is traveling along the forward path is equal to or longer than the threshold time, or when the backward distance traveled backward along the forward path by the vehicle VA is equal to or longer than the threshold distance, the suggestion screen 60 is displayed. Accordingly, the possibility of losing the opportunity of executing the reverse support control can be reduced, and the possibility that the driver feels troublesome in the suggestion to execute the reverse support control can be reduced.

Example 3

Figure 6:
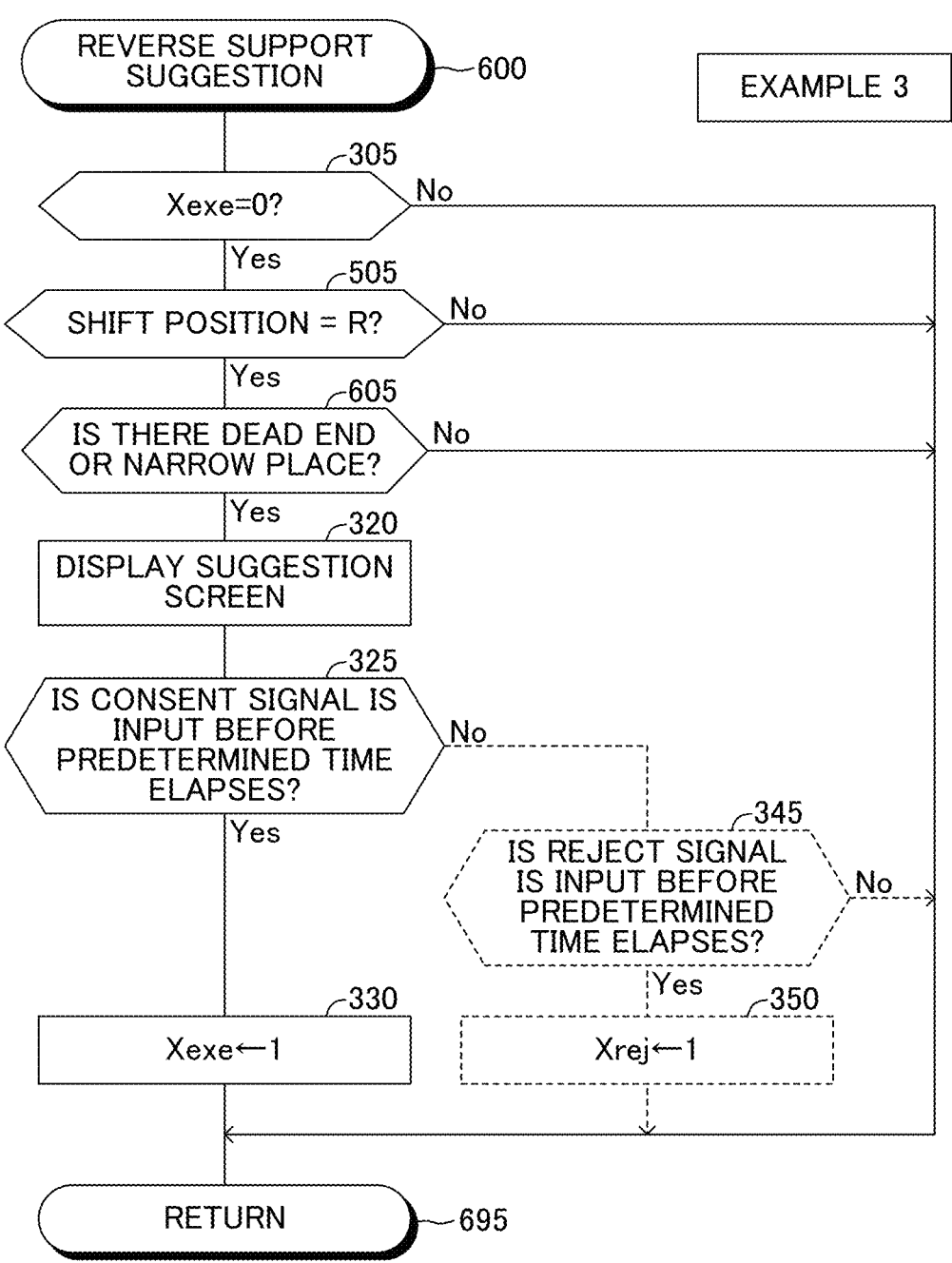
FIG. 6 is a flowchart illustrating a routine executed by the CPU of the ECU of the reverse support apparatus according to an example 3.

The CPU according to the present example executes a routine shown in FIG. 6 instead of the routine shown in FIG.

3. Note that the same reference numerals are given to the same processes as those shown in FIG. 3 and FIG. 5, and descriptions of the processes are omitted.

When an appropriate time point comes, the CPU starts a process from step 600 in FIG. 6. When the value of the execution flag Xexe is "0" ("Yes" at Step 305 shown in FIG. 6), and the shift position is the R range ("Yes" at Step 505 shown in FIG. 6), the process proceeds to Step 605.

At Step 605, the CPU determines whether or not the road on which the vehicle VA is traveling is the dead end or the vehicle VA is located in the narrow place.

Specifically, when the CPU determines that there is a "structure having a predetermined length and not being a vehicle, a pedestrian, a two-wheeled vehicle, or the like (for example, a guardrail, a wall, or the like)" within a predetermined distance from the front end of the vehicle VA, the CPU determines that the road on which the vehicle VA is traveling is the dead end. The CPU determines whether or not an object that is present within the predetermined distance from the front end of the vehicle VA is the above-described structure based on the front image data and the sonar object information transmitted from the front sonars 24A to 24D.

Further, when the CPU determines that the structure is present within a predetermined distance from the left side surface of the vehicle VA and that the structure is present within a predetermined distance from the right side surface of the vehicle VA, the CPU determines that the vehicle VA is located in the narrow place. The CPU determines whether or not an object that is present within a predetermined distance from the left side surface of the vehicle VA is the above-described structure, based on the left image data and the sonar object information transmitted from the left side sonars 28A and 28B. Similarly, the CPU determines whether or not an object that is present within a predetermined distance from the right side surface of the vehicle VA is the above-described structure based on the right image data and the sonar object information transmitted from the right side sonars 30A and 30B.

When the road on which the vehicle VA is traveling is the dead end or when the vehicle VA is located in the narrow place, the CPU makes a "Yes" determination at Step 605, and the process proceeds to Step 320 shown in FIG. 6. The processes after Step 320 shown in FIG. 6 is described in FIG. 3, so the description thereof is omitted.

According to the present example, when it is determined that the vehicle VA has entered the dead end or the narrow place based on the situation around the vehicle VA, it is determined that the suggestion condition is satisfied. In this case, the suggestion screen 60 is displayed. Accordingly, it is possible to reduce the possibility of losing the opportunity to execute the backward support control, and it is possible to reduce the possibility that the driver feels that the suggestion of the execution of the reverse support control is troublesome.

Combination of Examples

It is also possible to combine the examples 1 to 3. When the examples 1 to 3 are combined, for example, the suggestion condition of the example 2 may be satisfied after the suggestion condition of the example 1 or 3 is satisfied. In this case, the driver may operate the reject button 66 on the suggestion screen 60 displayed due to the previously satisfied suggestion condition. When the suggestion condition of the example 2 is satisfied after the driver operates the reject button 66, the suggestion screen 60 is displayed again. When the suggestion screen 60 is displayed again even though the driver refuses to execute the reverse support control, the driver may feel troublesome about the suggestion screen 60.

Therefore, in a case where the consent signal is not input before the predetermined time elapses ("No" at Step 325 shown in FIG. 3) when the process proceeds to step 325 shown in FIG. 3, the process proceeds to step 345. At step 345, the CPU determines whether or not the reject signal is input before the predetermined time elapses after displaying the proposal screen 60.

When the reject signal is input before the predetermined time elapses, the CPU makes a "Yes" determination at step 345 and executes Step 350. At Step 350, the CPU sets a rejection flag Xrej to "1". Thereafter, the process proceeds to step 335.

A value of the rejection flag Xrej is set to "1" when the rejection signal is input before the predetermined time elapses after displaying the suggestion screen 60, and is set to "0" when an invalidation time elapses after inputting the rejection signal. It is desirable that the invalidation time is set to be longer than the predetermined time.

When no reject signal is input before the predetermined time elapses, the CPU makes a "No" determination at step 345. Thereafter, the process proceeds to step 395, and the CPU terminates the present routine tentatively.

Furthermore, when the CPU makes a "Yes" determination at Step 510 shown in FIG. 5, the process proceeds to Step 515. In Step 515, the CPU determines whether or not the rejection flag Xrej is "0".

When the value of the rejection flag Xrej is "0", the CPU makes a "Yes" determination at Step 515, and the process proceeds to step 320 shown in FIG. 5, where the suggestion screen 60 is displayed. On the other hand, when the value of the rejection flag Xrej is "1", the CPU makes a "No" determination at Step 515, and the process proceeds to Step 595 and the CPU terminate the present routine tentatively. When the value of the rejection flag Xrej is "1", the suggestion screen 60 is not displayed even if the suggestion condition of the second embodiment is satisfied. Therefore, it is possible to reduce the possibility that the suggestion screen 60 is displayed again after the driver refuses to execute the reverse support control, and to reduce the possibility that the driver feels troublesome in the proposal screen 60.

When the CPU makes a "No" determination at Step 325 shown in FIG. 6, the CPU performs the determination at step 345.

In the first embodiment and the third embodiment, when the value of the rejection flag Xrej is "1" even if the suggestion condition is satisfied, the CPU does not need to display the suggestion screen 60.

<Modification>

The ECU 20 according to the present modification may change the thresholds used for the suggestion condition based on a consent-refusal history indicating whether the driver has consented or refused to execute the reverse support control. Specifically, the ECU 20 changes the thresholds so that the suggestion condition is easier to be satisfied as the number of times of consents increases, and changes the thresholds so that the suggestion condition is more difficult to be satisfied as the number of times of rejects increases.

In the suggestion condition (condition A) of the example 1, the threshold width Wth is the threshold. As the number of times of consents increases, the threshold width Wth is set to a larger value, and as the number of times of rejects increases, the threshold width Wth is set to a smaller value.

In the suggestion condition (condition C) of the example 2, the threshold time and the threshold distance are the threshold. As the number of times of consents increases, the threshold time and the threshold distance are set to a smaller value, and as the number of times of rejects increases, the threshold time and the threshold distance are set to a larger value.

The suggestion condition (condition B) of the example 3 is a condition that the structure is present within a predetermined distance from the vehicle VA. This predetermined distance is the threshold. As the number of times of consents increases, the predetermined distance is set to a longer value, and as the number of times rejects increases, the predetermined distance is set to a shorter value.

For example, the ECU 20 adds a predetermined first value to a suggestion index value when the consent button 64 is operated before the predetermined time elapses after the suggestion screen 60 is displayed. The ECU 20 subtracts a predetermined second value from the suggestion index value when the reject button 66 is operated before the predetermined time elapses after the proposal screen 60 is displayed. The ECU 20 changes the threshold so that the larger the suggestion index value is, the easier it is for the suggestion condition to be satisfied.

As described above, a frequency of display of the suggestion screen 60 can be adjusted according to whether or not the driver prefers to execute the reverse support control.

In the above-described embodiment, the ECU 20 suggests the reverse support control by displaying the suggestion screen 60 on the display 52, but the present disclosure is not limited thereto. For example, the ECU 20 may output a "suggestion voice message to suggest the reverse support control" from the speaker 54. Further, the ECU 20 may determine whether or not the driver consents to or refuses to the reverse support control by speech recognition.

In the above-described embodiment, the sonar for detecting the object with using ultrasonic waves is exemplified as a sensor for detecting the object, but any sensor may be used as long as it detects the object with using waves (for example, electromagnetic waves, sound waves, and the like).

The present apparatus may be applied to (or installed in/on) an engine vehicle, a hybrid electric vehicle (HEV), a plug-in hybrid electric vehicle (PHEV), a fuel cell electric vehicle (FCEV), and a battery electric vehicle (BEV)

What is claimed is:

1. A reverse support apparatus comprising:
a storage in which a forward path passed by a vehicle when the vehicle travels forward is stored; and
a controller configured to be able to execute a reverse support control for the vehicle to travel backward along the forward path, wherein,
the controller is configured to:
make a suggestion to a driver of the vehicle to execute the reverse support control, when it is determined that a suggestion condition is satisfied based on a situation around the vehicle or a backward path passed by the vehicle when the vehicle travels backward; and
execute the reverse support control when the driver consents the suggestion, wherein,
the controller is configured to:
make the suggestion condition easier to be satisfied, as the number of times the driver consents the suggestion increases; and
make the suggestion condition more difficult to be satisfied, as the number of times the driver refuses the suggestion increases.

2. The reverse support apparatus according to claim 1, wherein,
the controller is configured to determine that the suggestion condition is satisfied in a case where a time during which the vehicle is traveling backward along the forward path when the reverse support control is not executed is equal to or longer than a predetermined threshold time, or, in a case where a distance that the vehicle is traveling backward along the forward path when the reverse support control is not executed is equal to or longer a predetermined threshold distance.

3. The reverse support apparatus according to claim 1, wherein,
the controller is configured to determine that the suggestion condition is satisfied, when it is determined, based on the situation around the vehicle, that a road width of a road on which the vehicle is traveling is equal to or narrower a predetermined threshold width and there is an oncoming vehicle approaching the vehicle, or it is determined, based on the situation around the vehicle, that the road on which the vehicle is traveling is a dead end or too narrow for the vehicle to travel.

4. The reverse support apparatus according to claim 1, wherein,
the controller is configured to:
determine whether or not the suggestion condition is satisfied based on the situation around the vehicle;
determine whether or not the suggestion condition is satisfied based on the backward path; and
not to make the suggestion to the driver, even if it is determined that the suggestion condition is satisfied based on the backward path after the driver rejects the suggestion which is made when it is determined that the suggestion condition is satisfied based on the situation around the vehicle.

* * * * *